United States Patent
Yang et al.

(10) Patent No.: US 7,369,974 B2
(45) Date of Patent: May 6, 2008

(54) POLYNOMIAL GENERATION METHOD FOR CIRCUIT MODELING

(75) Inventors: Yifeng Yang, Chandler, AZ (US); Yun Zhang, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 230 days.

(21) Appl. No.: 11/217,577

(22) Filed: Aug. 31, 2005

(65) Prior Publication Data

US 2007/0046676 A1    Mar. 1, 2007

(51) Int. Cl.
*G06F 17/50* (2006.01)
*G06F 9/455* (2006.01)

(52) U.S. Cl. ................... 703/2; 703/20; 716/2
(58) Field of Classification Search ............... 703/2, 703/19, 5, 20; 716/3, 2; 345/419; 257/427
See application file for complete search history.

(56) References Cited

U.S. PATENT DOCUMENTS

| | | | | |
|---|---|---|---|---|
| 5,754,184 | A * | 5/1998 | Ring et al. | 345/604 |
| 6,075,888 | A * | 6/2000 | Schwartz | 382/167 |
| 6,208,982 | B1 * | 3/2001 | Allen et al. | 706/11 |
| 6,272,664 | B1 * | 8/2001 | Chang et al. | 716/3 |
| 6,639,592 | B1 * | 10/2003 | Dayanand et al. | 345/419 |
| 2004/0207035 | A1 | 10/2004 | Witcraft et al. | |
| 2005/0257077 | A1 * | 11/2005 | Dutta et al. | 713/340 |
| 2007/0022392 | A1 * | 1/2007 | Carelli, Jr. | 716/1 |

* cited by examiner

*Primary Examiner*—Thai Phan
(74) *Attorney, Agent, or Firm*—Ingrassia, Fisher & Lorenz, P.C.

(57) ABSTRACT

A method for determining polynomials to model circuit delay includes the step of determining one or more error areas in a characteristic map that exceed an error margin. Next, a current domain count is set to zero and selecting one error area of the one or more error areas is selected. A patch region that will contain the error area determined the patch region is then curve fitted and the current domain count is increased by one. The steps of repeating steps of selecting an error area, determine a patch, curve fitting within the patch, and increasing the domain count by one are repeated until there are no error area within the patch region. Then a previous domain region having the largest domain count and at last one error area is curve fitted without using data points in any of the domain regions greater than the previous domain region if the previous domain region contains at least one error area, repeating steps of selecting an error area, determine a patch, curve fitting within the patch, and increasing the domain count by one. Then, a domain region having at least one error area is selected as the previous domain region. The steps of curve fitting a previous domain level having at least one error area is repeated for all domain regions less than the previous domain region that has at least one error areas, until all error areas are removed from all domain regions. Additionally, the method can include using a nth order polynomial for curve fitting and associating the polynomial with the current domain region.

15 Claims, 5 Drawing Sheets

POLYNOMIAL GENERATION METHOD FOR CIRCUIT MODELING

TECHNICAL FIELD OF THE INVENTION

This invention relates to the field of circuit modeling and, more specifically, to a polynomial generation method for circuit modeling.

BACKGROUND OF THE INVENTION

To model delay in electronic circuits and devices, such as logic cells, delay models can be used. A commonly used methods to model delay or other device characteristics is the non-linear delay model (NLDM), developed by Synopsys, Inc. of Mountain View, Calif. The NLDM uses look-up tables indexed by sample points and utilizes bilinear interpolation to find delay within a certain domain. These look-up tables form libraries that define the structure, function, timing, and environment of the circuits and devices. The NLDM, while useful for many circuits, fails to take into account voltage and temperature effects in a single library. Additionally, large tables are required to support higher accuracy model calculations.

As an improvement to the NLDM, a scalable polynomial delay model/scalable polynomial power model (SPDM/SPPM) has been introduced. In the SPDM/SPPM, the lookup tables of the NLDM are replaced by scalable polynomials to model delay/power. Scalable polynomials are polynomials that can have both their order and form scaled to fit the data. In a SPDM/SPPM system, the data results achieved through simulation of a device can be curve fitted to an n-dimensional polynomial, which can be save as a Liberty library for further use in modeling the device. An advantage of the SPDM/SPPM system is that the stored polynomials typically take less memory to save as compared to the lookup tables used in the NLDM system. In addition, the SPDM can include temperature and voltage as additional dimensions.

One drawback to the use of SPDM/SPPM is that the derived curve may have a large error as compared to actual results. For example, while a given polynomial may be successful curve fitted to a given data set, other points outside the data set can lie far from derived polynomial curve. This error is known as overfitting. Overfitting typically becomes worse the higher the order of the polynomial that is used to curve fit the data set. One way to minimize overfitting is to increase the number of data points in the data set before curve fitting. Another way to minimize overfitting is to use lower order polynomials to curve fit the data.

Thus, current SPDM/SPPM systems have a tradeoff in terms of accuracy and throughput. In order to increase accuracy of a curve fit, high-order polynomials are needed to model the given circuit. However, the higher the order of the polynomial, the more likely overfitting is to occur. To compensate for the overfitting, more control points are needed to use to perform curve fitting. The more control points the larger the curve fit runtime and the lower the throughput. Increasing throughput requires less curve fit runtime, which implies less control points. If there are less control points, there is a more likelihood of overfitting occurring. In order to compensate for the likelihood of overfitting, lower order polynomials are used, which reduces the accuracy of the model.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures:

DETAILED DESCRIPTION OF THE DRAWINGS

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

Figure 1:
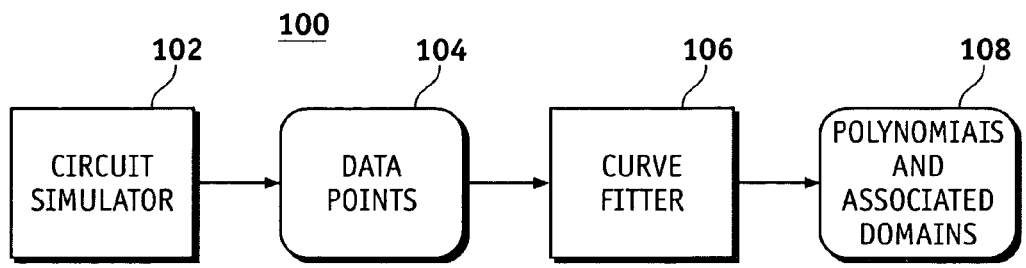
FIG. 1 illustrates and exemplary system for automatic domain generation.

FIG. 1 illustrates an exemplary embodiment of a system 100 for automotive domain generation. In FIG. 1, the system 100 includes a circuit simulator 102. Circuit simulator 102 produces a plurality of data points 104 that can be used by a curve fitter 106 to determine the appropriate polynomial. In one embodiment, circuit simulator 102 and curve fitter 106 can be the same device.

Circuit simulator 102 can be any device capable of modeling electronic circuits or devices. Circuit simulator 102 can determine various data points that correspond to various inputs and resultant outputs of the modeled circuit or device. For example, in one exemplary embodiment, the input is the input slew and the load. The input slew is a measure of the time required from the input to transition from one state to another, such as from a first user-defined threshold to a second user-defined threshold. The load measures the output capacitance of an output pin of the circuit. In one exemplary embodiment, the circuit simulator 102 is a general-purpose computer operable to execute circuit simulation software.

The output of the circuit simulator 102 is a set of data points 104. The number of data points 104 that are generated depends, at least in part, on the order of the polynomial that may be needed to model the circuit or device.

Curve fitter 106 generates a nth order polynomial 108 to model the delay and or other characteristics of the circuit or device. In the present invention, curve fitter 106 utilizes a domain based patch application method that can compensate for areas of excessive error. In one embodiment, the curve fitter will produce a delay mapping from input slew and capacitance data. Curve fitter 106, in one exemplary embodiment, can be a general-purpose computer operable to execute curve-fitting software. The polynomial 108 can then be used by circuit designers when they use the modeled device.

Figure 2:
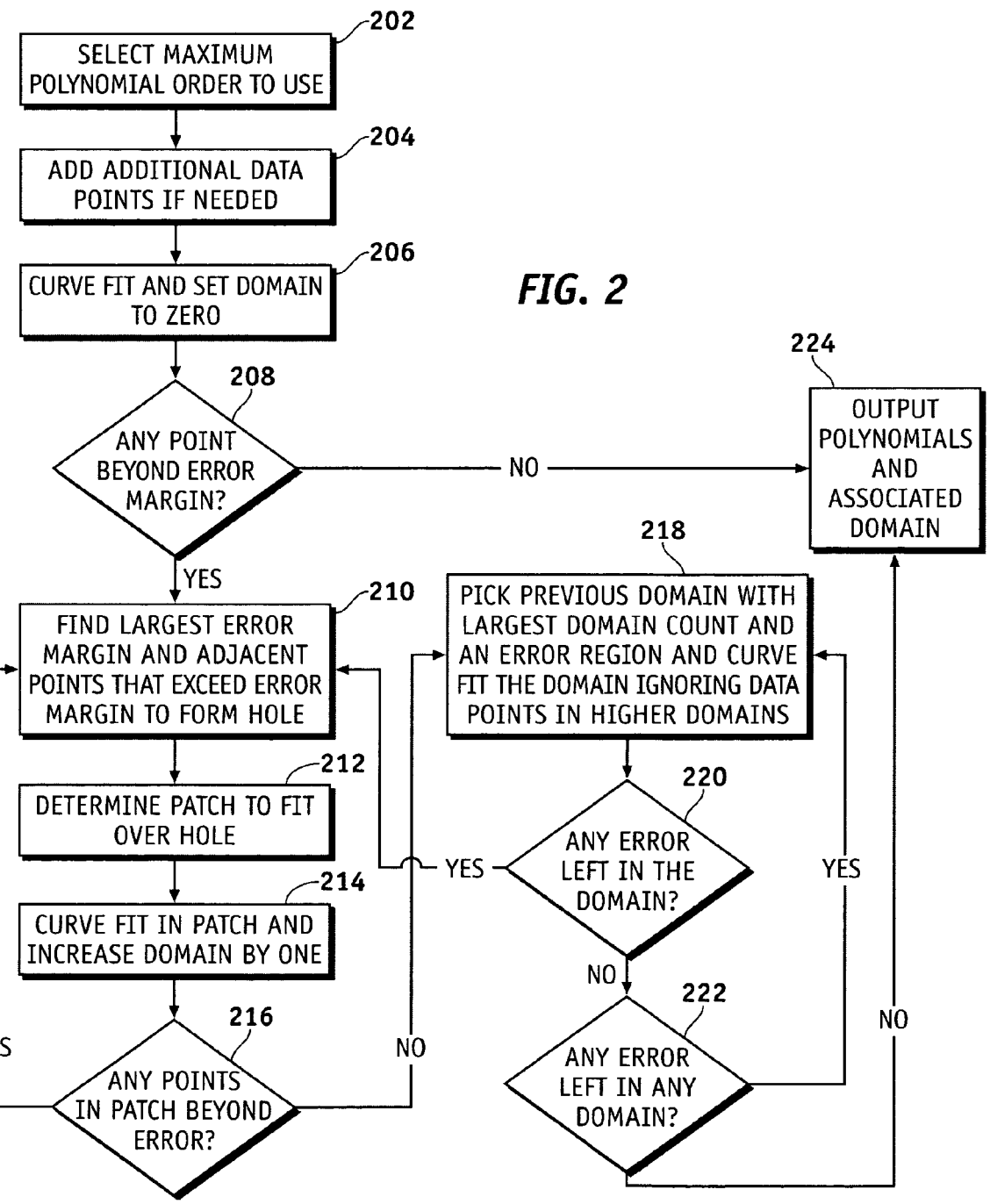
FIG. 2 is a flowchart illustrating an exemplary method for automatic domain generation.

FIG. 2 is a flowchart illustrating an exemplary method for deriving a polynomial for circuit modeling using a domain based patch optimization. The method of FIG. 2 can, in one exemplary embodiment, be performed using curve fitter 106. In a first step, step 202, a maximum order of polynomial to use to model the delay/power or other characteristic behavior of the circuit or device is selected. Since the present invention can compensate for errors, the maximum order of the polynomial can be lower than that typically used to derive a SPDM/SPPM solution. The order of the polynomial can be chosen, at least in part, to best compromise between throughput and accuracy.

Once the maximum order of the polynomial is chosen, in step 204, the derived data set is examined to determine if there are enough data points to generate a polynomial. If not, additional points can be added to the data set by use of bilinear interpolation.

Next, in step 206, a curve fit routine is run using the data set and the order of the previously chosen to generate the polynomial. In one embodiment, a lower order polynomial is initially chosen and the results checked. If the results are within a predetermine error measurement, then that polynomial is selected. If the lower ordered polynomial does not achieve desired results, the next highest order polynomial is selected and the process is repeated, up to the maximum polynomial order selected. The polynomial, in one exemplary embodiment, can generate a delay surface, which is a three-dimensional graph of delay for corresponding input slew and output load, Depending on the data used, other characteristic surfaces or maps can be generated. Since this is the start of the polynomial derivation process the domain count is set to zero and the derived polynomial is associated with a domain region of zero.

The delay surface is then examined to determine if there are any data points in the delay surface formed by the derived polynomial that are beyond an error tolerance as compared to actual values, in step 208. In one exemplary embodiment, the error is determined by comparing every data point of the characteristic results to the interpolated results generated by using the polynomial. Other ways can be used to set an error margin. If there are no data points in the curve fitted area that exceeds an error tolerance, or if the amount of error points is within an acceptable limit, the polynomial deriving process is finished and the method continues in step 224.

Figure 3:
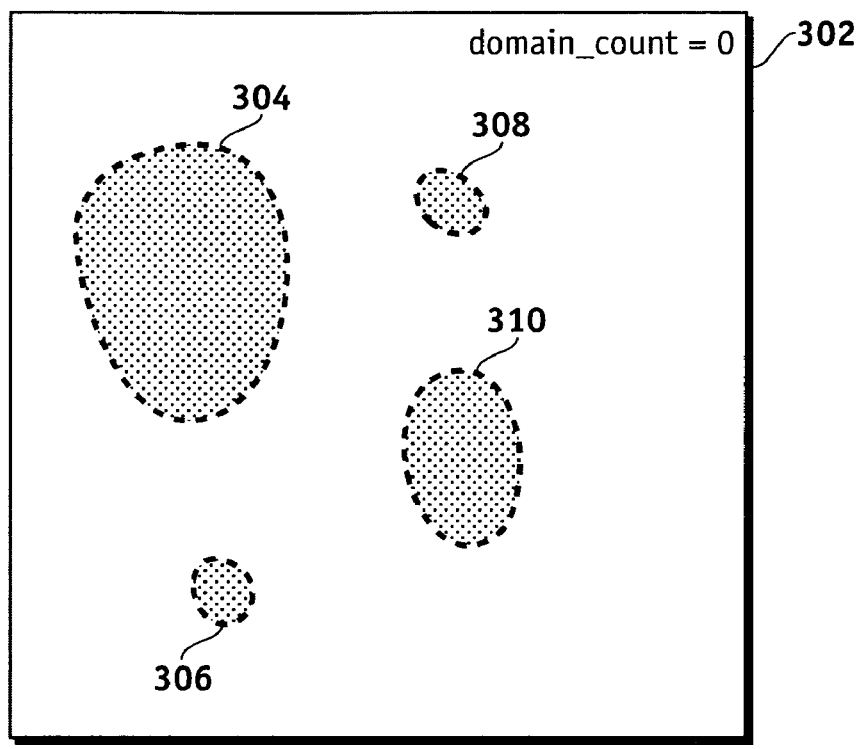
FIGS. 3-10 illustrate graphs of delay space for load versus slew rate corresponding to the steps in the method of FIG. 2.

If there are data points that exceeds an error margin, in step 210, the data point with the largest error margins is selected and the data points adjacent to that data point which also exceed the error margin are selected. The collection of these data points forms an error area in the delay surface. The process of forming the error areas continues for other points where there are data points exceeding an error margin. FIG. 3 illustrates a delay space 302 including a first error area 304, a second error area 306, a third error area 308 and a fourth error area 310.

Figure 4:
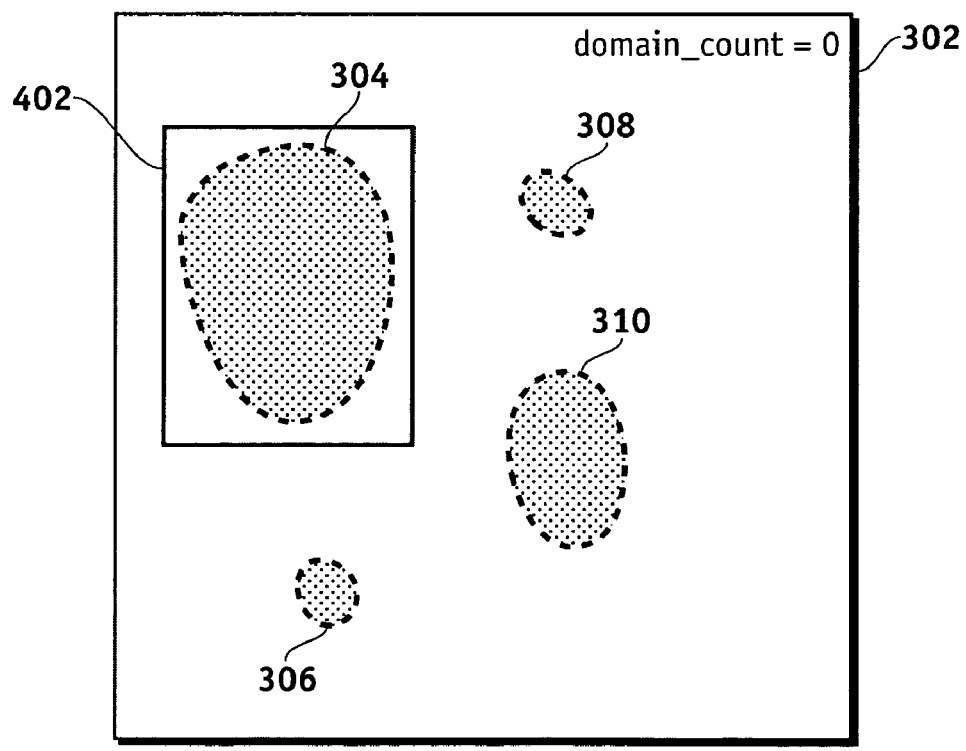

Next, in step 212, a patch 402 is created to cover the largest error area determined in step 204. While typically the largest error area is selected to initially curve fit, other error areas can also be used initially. The patch 402 defines a domain region where an additional curve fit routine can be run. FIG. 4 illustrates a delay space having a first patch 402 positioned over the first error area. While patch 402 is shown as a rectangular reason, any shape that includes the error area can be used, although the computational complexity may increase.

In step 214, curve fitting is done within the patch region only. The domain count is increased by one and the polynomial determined in step 214 is associated with the domain region having that domain count. Note that in the exemplary embodiment shown in FIG. 4, the first patch 402 is also the first domain region while the original delay space 302, represents a zero domain region.

Figure 5:
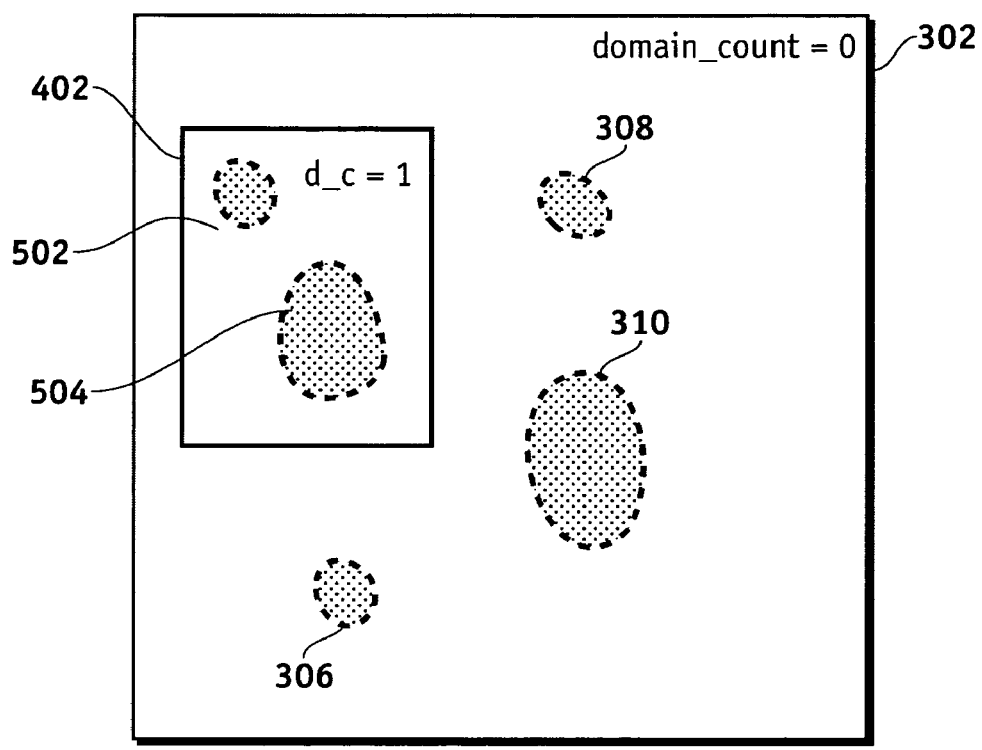
Figure 6:
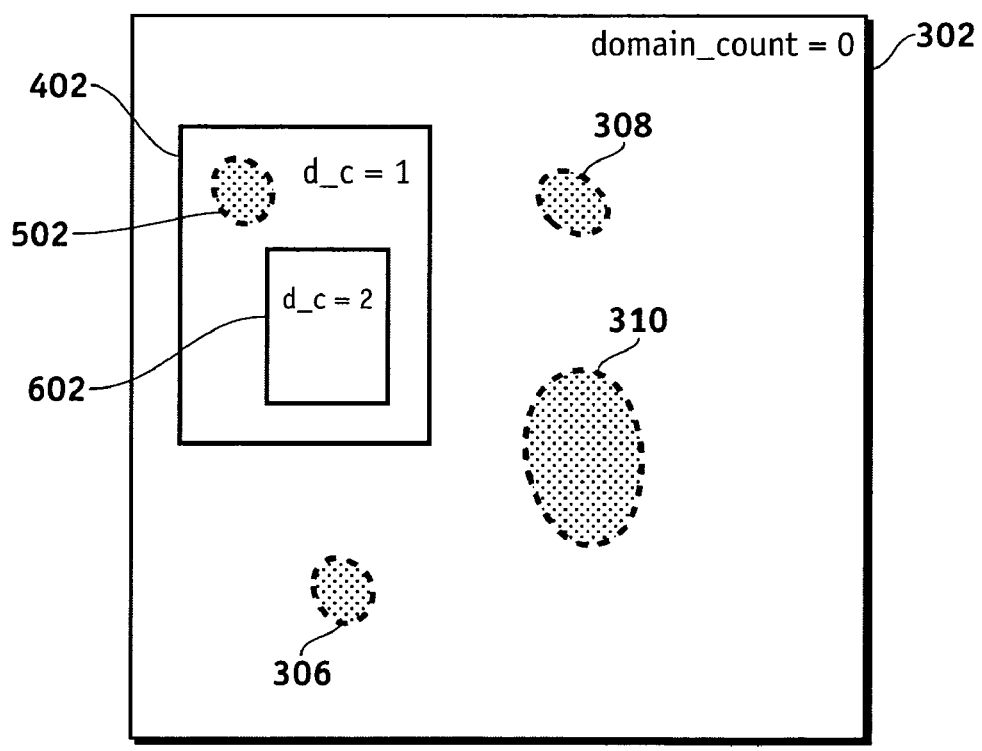

Next, in step 216, the points within the first patch 402 are checked to see if there are any data points that are beyond an error margin. As illustrated in FIG. 5, after the polynomial is derived for the first patch, a fifth error area 502 and a sixth error area 504 are still within first patch 402. Since there are still data points that are beyond an error margin, in step 218, additional error areas are formed and the process returns to step 210 where a patch is generated to cover the largest error area. Then the process continues in step 212 and 214 where a polynomial is determined for the patch region within the patch region. The domain count is then increased by one. Therefore, the second patch is the second domain region. The result is illustrated in FIG. 6, which shows a second patch 602 inside of first patch 402. Since there are no error areas within the second patch 602, the method continues in step 218.

In step 218, the domain region having the largest domain count and an error area is determined and that domain region is curve fitted again ignoring all data points in the domain regions having a higher domain count. Note in FIG. 6, there is still an error area 502 inside of the first patch, which corresponds to the first domain count. Therefore, in accordance with step 218, a new polynomial is determined for the data points within the first patch while ignoring the data points in the second region. In step 220, it is determined if there are any more error areas in the current domain region. If there are, the process returns to step 210. In one example, the results can be seen in FIG. 7 that there are no more error areas in the second patch or the first patch. However, there are error areas in the zero domain regions.

Figure 7:
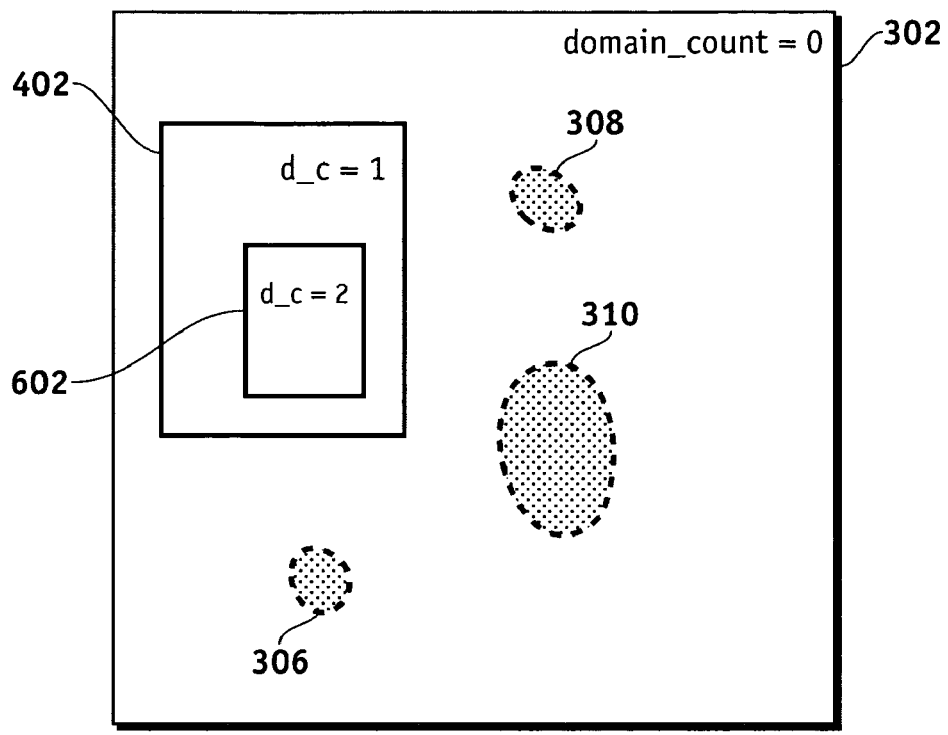

If there are no more error areas in the current domain region, it is determined, in step 222, if there are any data points in any previously evaluated domain region that exceed an error margin. If there are previously evaluated domain regions where there are data points that exceed an error margin, the process continues at step 218. As seen in FIG. 7, there are still three error areas in the zero domain region. Therefore, a new polynomial curve will be determined for the zero domain region, the polynomial determined without using the data points in the first and second domain region. The result is illustrated in FIG. 8, where the error area 306 has been removed.

Figure 8:
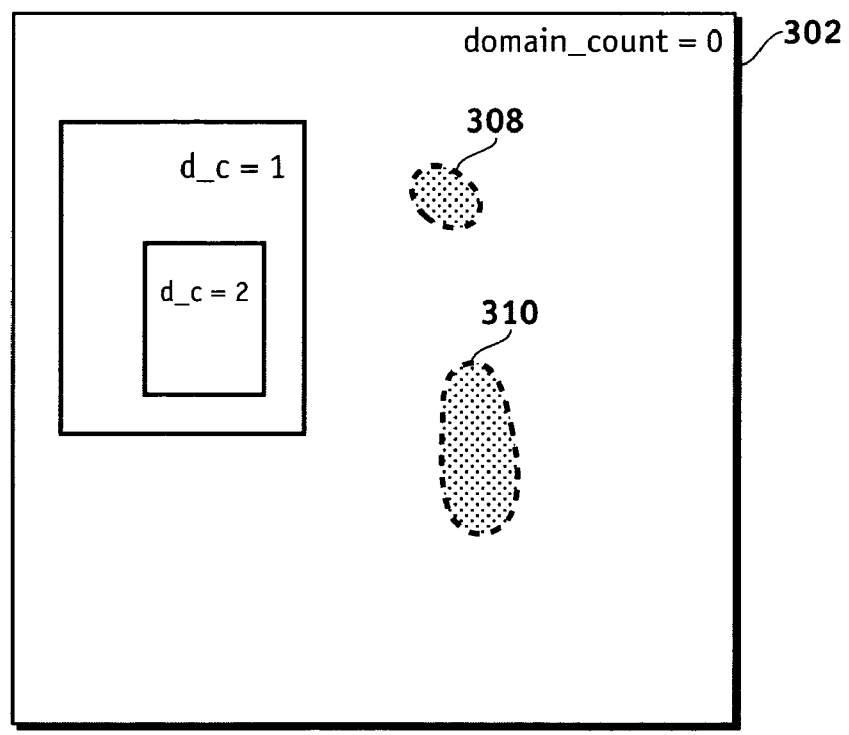
Figure 9:
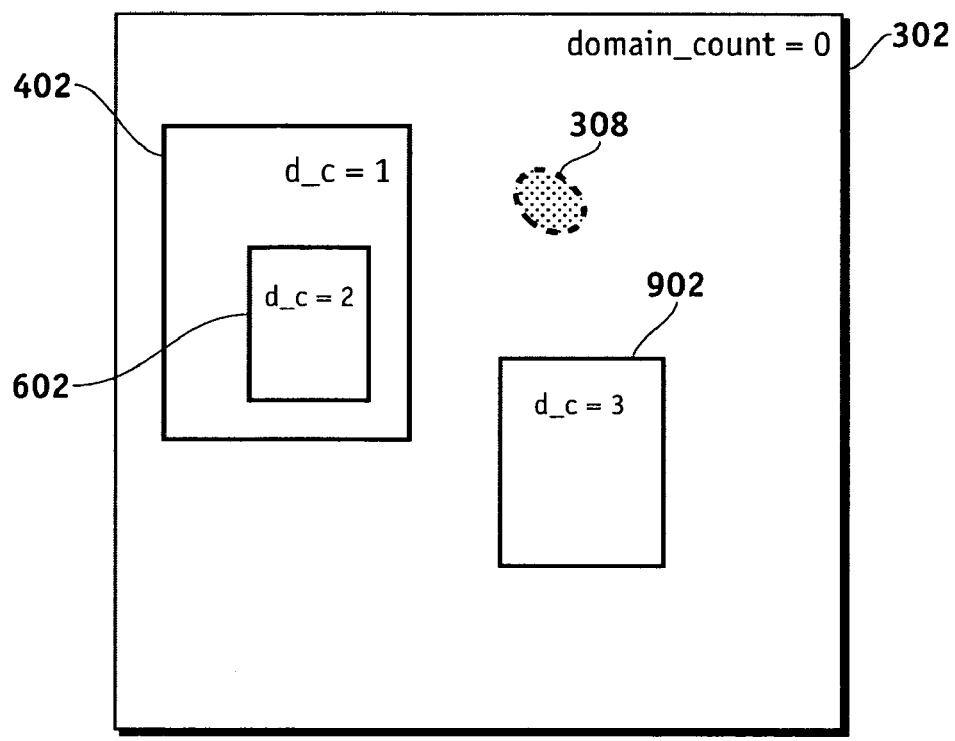

As seen in FIG. 8, there are still two error areas in the zero domain region. As discussed before, according to step 220 of the method, if there are error areas in the current domain region after determining the curve fitting polynomial, the method returns to step 212 where a patch is selected for the region and the patch is curve fitted with a polynomial. In addition, the domain count increases by one. The result is illustrated in FIG. 9, which illustrates a third patch 902, which also corresponds to the third domain region.

Figure 10:
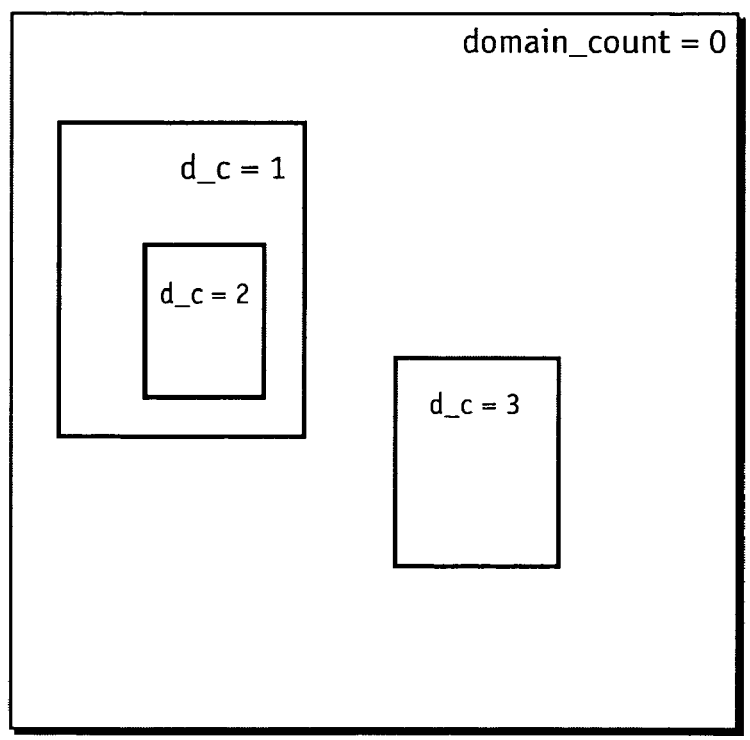

Still, in the zero domain region, there is one error area, error area 308, remaining. Since this means there is a lower domain region than the current domain region that has an error area (currently the calculations are being done in the third domain region), in accordance with step 218, a new curve fit routine is calculated without using any data points from the first, second and third domain regions. This calculation removes the last error area and now all data points are below an error margin, as seen in FIG. 10, and the method continues in step 224.

In step 224, each domain region and the associated polynomial are outputted for use in a circuit analyzer. In one exemplary embodiment the output is in a library format. In this environment, the domain region that has the highest count is sent listed first, with the other domain regions and associate polynomials following in reverse numerical order.

In summary, systems and methods configured in accordance with example embodiments of the invention relate to:

A method for generating a polynomial for use in circuit modeling system comprising the steps of (a) curve fitting a characteristic map, (b) determining an error area in the characteristic map (c) generating a patch region enclosing the error areas, (d) curve fitting the patch region. The steps c and b can be repeated for all error areas.

In the method the curve fitting of step d further comprises using a nth order polynomial for curve fitting; and associating the polynomial with the current domain region. Also, the method further comprises outputting the polynomials for each domain region in order of decreasing domain count.

In one embodiment, the step of curve fitting further comprises using a nth degree polynomial to curve fit a delay model. Additionally, the nth order polynomial can be generated using data points generated by a circuit simulator and extra data points can be provided by bilinear interpolation of the data points from the circuit simulator.

A system for generating a polynomial based mode of a circuit comprises a circuit simulator operable to generate a data set comprising a plurality of data points and a curve fitter operable to (a) determine one or more error areas in the characteristic map that exceed an error margin, (b) set a current domain count of a domain region to zero, (c) determine a patch region that will contain the error area, and (d) curve fit the patch region and increasing the current domain count by one. Then (e) the steps d-e repeat until there are no error area within the patch region. Next, the curve fitter is further operable to (f) curve fit a previous domain region, the previous domain region selected as a domain region having the highest domain count and at least one error area, without using data points in any of the domain regions greater then the previous domain region, and (g) repeat steps d-e; if the previous domain region contains at least one error area. The curve fitter is also operable to (h) select the previous domain region having at least one error area; and repeat the step f for all domain regions less than the previous domain region that has at least one error areas, until all error areas are removed from all domain regions.

In one embodiment, the characteristic map is generated from a nth order polynomial. In addition, the characteristic map can be a delay map. The delay map is generated by a nth degree polynomial from input slew data and output capacitance data.

The curve fitter is also further operable to determine extra data points by bilinear interpolation of the data points from the circuit simulator. Additionally, the curve fitter is further operable to output the polynomials for each domain region in order of decreasing domain count.

A method for determining polynomials to model circuit delay includes the step of determining the largest error area in a characteristic map. Next, a current domain count of a domain region is set to zero. A patch region that will contain the error area is determined. The patch region is then curve fitted and the current domain count is increased by one. The steps of repeating steps determine a patch, curve fitting within the patch, and increasing the domain count by one are repeated until there are no error areas within the patch region. Then, a previous domain region having the highest domain count and at least one error area is curve fitted without using data points in any of the domain regions having a greater current domain count then the previous domain region. If the previous domain region contains at least one error area, the steps of determine a patch, curve fitting within the patch, and increasing the domain count by one are repeated. The steps of curve fitting a previous domain region having at least one error area and repeating the steps of determine a patch, curve fitting within the patch, and increasing the domain count by one, if the previous domain region contains at least one error area are repeated for all domain regions, until all error areas are removed from all domain regions. Additionally, the method can include using a nth order polynomial for curve fitting and associating the polynomial with the current domain region.

In one embodiment, the step of determining a plurality of error areas of a characteristic map comprises generating the characteristic map from a nth order polynomial. The method further comprising generating the nth order polynomial using data points generated by a circuit simulator and providing extra data points by bilinear interpolation of the data points from the circuit simulator.

Further, the polynomials for each domain region are outputted in order of decreasing the domain count. Additionally, the step of determining one or more error areas in a characteristic map further comprises determining one or more error areas in a delay map. The delay map is generated by a nth degree polynomial from input slew data and output capacitance data.

The example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. A method for generating a polynomial for use in circuit modeling comprising:
   a. iteratively curve fitting a characteristic map having a set of domain regions characterized by a current domain count without using data points in a domain region having a greater current domain count;
   b. determining, for each of the domain regions, an error area in the characteristic map;
   repeatedly performing the steps of:
   c. generating a patch region enclosing the error area; and
   d. curve fitting, using an nth order polynomial, the patch region, until there is no remaining error area in the patch region, wherein the polynomial is associated with the domain count, which is incremented for each patch region.

2. The method of claim 1 further comprising generating the nth order polynomial using data points generated by a circuit simulator.

3. The method of claim 2 further comprising providing extra data points by bilinear interpolation of the data points from the circuit simulator.

4. The method of claim 1 further comprising outputting the polynomials in order of decreasing the domain count.

5. A system for generating a polynomial based mode of a circuit comprising:
   a circuit simulator operable to generate a data set comprising a plurality of data points;
   a curve fitter operable to:
   a. generate a characteristic map from the data set, wherein the characteristic map has a set of domain regions characterized by a current domain count;
   b. determine an error area in the characteristic map;
   c. determine a patch region that will contain the error area; and
   d. iteratively curve fit, using an nth order polynomial, the patch region until there is no remaining error area in the patch region, without using data points in a domain region having a greater current domain count, and by associating the polynomial with the domain count, which is incremented for each patch region.

6. The system of claim 5 wherein the curve fitter is further operable to determine extra data points by bilinear interpolation of the data points from the circuit simulator.

7. The system of claim 5 wherein the curve fitter is further operable to:
increment a patch region count each time step c and d are executed; and
output the polynomials for each patch region in order of decreasing patch count.

8. The system of claim 5 wherein the characteristic map is a delay map.

9. The system of claim 8 wherein the delay map is generated by the nth degree polynomial from input slew data and output capacitance data.

10. A method for determining polynomials to model circuit delay comprising:
a. determining an error area in a characteristic map;
b. setting a current domain count of a domain region to zero;
c. determining a patch region that will contain the error area;
d. curve fitting the patch region and increasing the current domain count by one;
e. repeating the steps c-d until there are no error area within the patch region;
f. determining a previous domain region having the largest domain count and an error area and curve fitting the previous domain region without using data points in any of the domain regions having a greater current domain count than the previous domain region;
g. if, after curve fitting the previous domain, the previous domain region contains at least one error area, repeating steps c-e for the at least one error area;
h. repeating the steps f-g for all domain regions less than the previous domain region that has at least one error areas, until all error areas are removed from all domain regions.

11. The method of claim 10 wherein the step of determining an error area of a characteristic map comprises generating the characteristic map using data points generated by a circuit simulator and a nth order polynomial.

12. The method of claim 11 further comprising providing extra data points by bilinear interpolation of the data points from the circuit simulator.

13. The method of claim 10 wherein the curve fitting of steps c and f further comprises:
using a nth order polynomial for curve fitting; and
associating the polynomial with the domain region.

14. The method of claim 10 further comprising outputting the polynomials for each domain region in order of decreasing domain count.

15. The method of claim 14 wherein the step of determining an error area in a characteristic map further comprises determining an error area in a delay map generated by a nth degree polynomial from input slew data and output capacitance data.

* * * * *